US012239123B2

(12) United States Patent
Grimm et al.

(10) Patent No.: US 12,239,123 B2
(45) Date of Patent: Mar. 4, 2025

(54) SYSTEMS AND METHODS FOR SPRAYING AN AGRICULTURAL FLUID ON FOLIAGE

(71) Applicant: Capstan Ag Systems, Inc., Topeka, KS (US)

(72) Inventors: Jeffrey John Grimm, Holton, KS (US); Andrew J. Holtz, Heber, CA (US)

(73) Assignee: Capstan Ag Systems, Inc., Topeka, KS (US)

( * ) Notice: Subject to any disclaimer, the term of this patent is extended or adjusted under 35 U.S.C. 154(b) by 0 days.

(21) Appl. No.: 18/364,144

(22) Filed: Aug. 2, 2023

(65) Prior Publication Data

US 2023/0380403 A1   Nov. 30, 2023

Related U.S. Application Data

(63) Continuation of application No. 17/451,268, filed on Oct. 18, 2021, now Pat. No. 11,730,158, which is a
(Continued)

(51) Int. Cl.
*A01M 7/00*     (2006.01)
*A01C 23/04*    (2006.01)
(Continued)

(52) U.S. Cl.
CPC ......... *A01M 7/0042* (2013.01); *A01C 23/047* (2013.01); *A01M 7/0014* (2013.01);
(Continued)

(58) Field of Classification Search
CPC .............. A01M 7/0089; A01M 7/0042; A01M 7/0014; A01C 23/047
See application file for complete search history.

(56) References Cited

U.S. PATENT DOCUMENTS 2,746,794 A * 5/1956 Fish ..................... A01M 7/0014
                                                       239/127
4,015,366 A * 4/1977 Hall, III .................. A01G 3/04
                                                       193/25 E
(Continued)

FOREIGN PATENT DOCUMENTS

EP      1943899 A1      7/2008
EP      2186405 A1      5/2010
(Continued)

OTHER PUBLICATIONS

Chen, "Development of an Intelligent Sprayer to Optimize Pesticide Applications in Nurseries and Orchards", 2010, dissertation presented to the Graduate School of The Ohio State University.
(Continued)

*Primary Examiner* — Joseph A Greenlund
(74) *Attorney, Agent, or Firm* — Armstrong Teasdale LLP (57) ABSTRACT

A system for applying agricultural fluid to a target includes a controller communicatively connected to valve assemblies and configured to control at least one operating parameter of each valve assembly, and a portable electronic device connected in communication with the controller. The portable electronic device includes a user interface. The portable electronic device is configured to retrieve a stored user profile including at least one prestored value that relates to a physical characteristic of the system or an operating parameter of the system, and populate at least one user input field of the user interface with the at least one prestored value. At least one of the controller and the portable electronic device is configured to retrieve the stored user profile and determine the at least one operating parameter of each valve assembly based on the physical characteristic of the system or the operating parameter of the system.

20 Claims, 10 Drawing Sheets

Related U.S. Application Data continuation of application No. 16/272,858, filed on Feb. 11, 2019, now Pat. No. 11,147,258.

(60) Provisional application No. 62/629,161, filed on Feb. 12, 2018.

(51) Int. Cl.
  *B05B 7/00* (2006.01)
  *B05B 13/00* (2006.01)

(52) U.S. Cl.
  CPC ......... *A01M 7/0089* (2013.01); *B05B 7/0075* (2013.01); *B05B 13/005* (2013.01)

(56) References Cited

U.S. PATENT DOCUMENTS

| | | | |
|---|---|---|---|
| 4,116,385 A | 9/1978 | Waldron | |
| 4,168,798 A | 9/1979 | Moore et al. | |
| RE31,023 E * | 9/1982 | Hall, III | A01G 7/00 |
| | | | 193/25 E |
| 4,347,978 A | 9/1982 | Lenhardt | |
| 4,565,318 A | 1/1986 | Inculet | |
| 4,609,145 A | 9/1986 | Miller | |
| 4,666,089 A | 5/1987 | Inculet | |
| 4,721,246 A | 1/1988 | Lefebvre et al. | |
| 4,762,274 A | 8/1988 | Burls et al. | |
| 4,768,713 A * | 9/1988 | Roper | A01M 7/0014 |
| | | | 239/99 |
| 4,823,268 A | 4/1989 | Giles et al. | |
| 4,893,755 A | 1/1990 | Keathley | |
| 4,989,783 A | 2/1991 | Douglas | |
| 4,991,341 A | 2/1991 | Douglas | |
| 5,134,961 A | 8/1992 | Giles et al. | |
| 5,144,767 A | 9/1992 | McCloy et al. | |
| 5,164,961 A | 11/1992 | Gudmundson | |
| 5,172,861 A | 12/1992 | Lenhardt | |
| 5,278,423 A * | 1/1994 | Wangler | G01S 17/42 |
| | | | 47/1.7 |
| 5,297,442 A | 3/1994 | Wolf et al. | |
| 5,315,564 A * | 5/1994 | Upton | A01M 7/0089 |
| | | | 310/317 |
| 5,381,624 A | 1/1995 | Davis et al. | |
| 5,416,723 A | 5/1995 | Zyl | |
| 5,485,956 A | 1/1996 | Lenhardt | |
| 5,522,544 A | 6/1996 | Gal | |
| 5,547,128 A * | 8/1996 | Scheffler | A01M 7/0014 |
| | | | 47/1.01 R |
| 5,601,237 A | 2/1997 | Harding et al. | |
| 5,636,792 A * | 6/1997 | Sauter | A01B 69/022 |
| | | | 239/172 |
| 5,662,267 A | 9/1997 | Hulls | |
| 5,768,823 A | 6/1998 | Nelson | |
| 5,921,019 A * | 7/1999 | Baek | A01M 7/0089 |
| | | | 47/1.7 |
| 5,971,294 A | 10/1999 | Thompson et al. | |
| 5,971,295 A * | 10/1999 | Jensen | A01M 7/006 |
| | | | 239/587.5 |
| 6,152,382 A | 11/2000 | Pun | |
| 6,209,257 B1 * | 4/2001 | Nishimura | A01C 23/047 |
| | | | 47/1.7 |
| 6,250,564 B1 * | 6/2001 | Chahley | B05B 15/658 |
| | | | 239/586 |
| 6,302,332 B1 * | 10/2001 | Panneton | A01M 7/0067 |
| | | | 239/8 |
| 6,606,820 B2 * | 8/2003 | Nishimura | A01M 7/0014 |
| | | | 47/1.7 |
| 6,708,080 B2 | 3/2004 | Benneweis | |
| 6,786,425 B2 * | 9/2004 | Rawlings | B05B 1/3013 |
| | | | 239/DIG. 15 |
| 8,191,795 B2 * | 6/2012 | Grimm | A01M 7/0089 |
| | | | 239/69 |
| 8,844,838 B2 | 9/2014 | Funseth et al. | |
| 8,851,403 B2 | 10/2014 | Thomas et al. | |
| 9,127,241 B2 | 9/2015 | Hodge et al. | |
| 9,339,023 B2 * | 5/2016 | Ballu | A01M 7/0057 |
| 9,420,776 B2 * | 8/2016 | Kline, III | A01M 7/0089 |
| 9,504,212 B2 * | 11/2016 | Michael | A01G 25/16 |
| 9,630,195 B2 * | 4/2017 | Johnson | A01M 7/0014 |
| 9,635,848 B2 * | 5/2017 | Needham | A01M 7/0089 |
| 9,683,200 B2 | 6/2017 | Hodge et al. | |
| 9,724,966 B2 * | 8/2017 | Daffue | B60B 35/109 |
| 10,149,468 B2 * | 12/2018 | Crinklaw | G05D 1/0274 |
| 10,209,179 B2 * | 2/2019 | Hollstein | A01M 9/0092 |
| 10,656,066 B2 * | 5/2020 | Sarkar | B05B 12/082 |
| 2005/0000277 A1 * | 1/2005 | Giles | A01M 7/0089 |
| | | | 73/114.51 |
| 2006/0273189 A1 * | 12/2006 | Grimm | A01G 25/16 |
| | | | 239/146 |
| 2007/0252020 A1 * | 11/2007 | Smeraldi | A01M 7/0014 |
| | | | 239/354 |
| 2010/0032492 A1 * | 2/2010 | Grimm | A01M 7/0089 |
| | | | 239/76 |
| 2010/0179734 A1 * | 7/2010 | Schumann | A01M 7/0089 |
| | | | 701/50 |
| 2012/0271467 A1 * | 10/2012 | Grimm | A01M 7/0089 |
| | | | 700/283 |
| 2012/0325929 A1 * | 12/2012 | Landers | A01M 7/0014 |
| | | | 239/78 |
| 2013/0269578 A1 * | 10/2013 | Grimm | A01C 7/06 |
| | | | 111/127 |
| 2014/0252111 A1 * | 9/2014 | Michael | A01M 7/0042 |
| | | | 239/11 |
| 2015/0257334 A1 * | 9/2015 | Wolters | A01M 7/0089 |
| | | | 111/118 |
| 2016/0175869 A1 * | 6/2016 | Sullivan | A01M 7/0042 |
| | | | 239/11 |
| 2016/0338335 A1 * | 11/2016 | Hammer | B05B 13/005 |
| 2017/0071188 A1 * | 3/2017 | Rees | A01M 7/0089 |
| 2017/0079200 A1 * | 3/2017 | Posselius | B05B 9/0403 |
| 2017/0251656 A1 * | 9/2017 | Kolb | A01C 23/023 |
| 2017/0251657 A1 * | 9/2017 | Leeb | A01C 23/047 |
| 2018/0000006 A1 * | 1/2018 | Grimm | A01C 7/06 |
| 2018/0024050 A1 * | 1/2018 | Hollstein | G01N 33/0098 |
| | | | 382/103 |
| 2018/0052088 A1 * | 2/2018 | Sarkar | G01N 15/0227 |
| 2019/0150357 A1 * | 5/2019 | Wu | H04N 7/188 |
| 2019/0246617 A1 * | 8/2019 | Grimm | A01M 7/0042 |
| 2019/0358661 A1 * | 11/2019 | Bharatiya | A01M 7/0096 |
| 2020/0230633 A1 * | 7/2020 | Serrat | A01M 21/043 |

FOREIGN PATENT DOCUMENTS

| | | |
|---|---|---|
| GB | 2181974 A | 5/1987 |
| KR | 101200551 B1 | 11/2012 |
| WO | 2001001771 A1 | 1/2001 |
| WO | 2016145000 A1 | 9/2016 |
| WO | 2016145081 A2 | 9/2016 |

OTHER PUBLICATIONS

International Search Report and Written Opinion issued in connection with PCT/US2019/017634, mailed Apr. 18, 2019, 16 pages.

Pai, "Controlling Airblast Sprayer Air for Variable Rate Application in Orchards", 2007, thesis presented to the Graduate School of the University of Florida.

Second Written Opinion of the International Preliminary Examining Authority issued in connection with PCT/US2019/017634, mailed Apr. 14, 2020, 6 pages.

* cited by examiner

| Profile: | Select or Add Profile ▽ | New | Copy | Remove |
| --- | --- | --- | --- | --- |
| Name: | Name | | | |
| Specific Gravity: | Specific Gravity | | | |
| V Size: | V Size | | | |
| Nozzle Size: | Nozzle Size | | | |
| Diameter of Sprayer: | Diameter | | | |

| Profile: | Default ▽ | | New | Copy | Remove |

Name: Default

Specific Gravity: 1

V Size: 15.5

Nozzle Size: 2

Diameter of Sprayer: 1

Next Step

Review & Save

Name: Default          Specific Gravity: 1

V Size: 15.5           Diameter of Sprayer: 1

MPH: 2.5               GPA: 75

Row Spacing FT: 75     PSI: 125

Nozzle Data: L0100001 - R010001
L1100002 - R110002

Previous Step                Save   Save & Submit 100, 108

SYSTEMS AND METHODS FOR SPRAYING AN AGRICULTURAL FLUID ON FOLIAGE

CROSS-REFERENCE TO RELATED APPLICATION

This application is a continuation of U.S. patent application Ser. No. 17/451,268, filed on Oct. 18, 2021, which is a continuation of U.S. patent application Ser. No. 16/272,858, filed on Feb. 11, 2019, which claims priority to U.S. Provisional Patent Application Ser. No. 62/629,161, filed on Feb. 12, 2018, the disclosures of which are hereby incorporated by reference in their entirety.

BACKGROUND

The present disclosure relates generally to fluid application systems, and particularly, to systems for spraying an agricultural fluid on foliage.

In the agricultural industry, agricultural fluids or agrochemicals are commonly applied to plants for a variety of reasons. For example, liquid fertilizers, pesticides, and other agrochemicals may be applied to plants or crops after planting for crop management. Agricultural fluids include, without limitation, growth promotors, growth regulators, spray fertilizers, pesticides, insecticides, and/or fungicides.

For example, agricultural fluids may be applied to the foliage of plants in groves or orchards. The groves or orchards may include plants such as vines and trees that have an uneven distribution of foliage. On some plants, the foliage may be concentrated anywhere along the height of the plant. For example, the foliage may be concentrated at the top of the plant and may be relatively sparse at the base of the plant. In addition, the plants may be different sizes and be shaped irregularly. Accordingly, it may be difficult to apply the fluid throughout the foliage in an even manner.

Typically, systems for applying agricultural fluids to foliage include a fluid supply line (e.g., a manifold or boom pipe), and a plurality of nozzle assemblies that receive fluid from the fluid supply line for applying the fluid to a field. The systems may also include a fan or blower to provide airflow that carries the agricultural fluid towards the foliage. In prior systems, the spray tip or orifice of each of the nozzle assemblies was selected based on variations in the foliage to which the fluid was being applied. Spray tips or orifices were selected based on the foliage density, the desired application rate, and the current configuration of the nozzle assemblies relative to the foliage. However, calculations needed to determine appropriate spray tips or orifices are often difficult to perform accurately in the field. Accordingly, operators may be prone to estimate or guess at least some of the factors for determining proper nozzle adjustment. Errors made in the calculations and/or inaccurate estimates may reduce the effectiveness of the adjustments and may even exacerbate the inefficiencies of the spray process. Moreover, manually interchanging spray tips or orifices on each nozzle assembly to produce a desired spray pattern or characteristic increases the time required to perform a spraying operation.

At least some known systems include sensors that detect foliage to allow the system to be controlled based on the detected foliage. However, such systems can only control the system based on a range of operating conditions for groups of nozzle assemblies and may not be able to adjust the nozzle assemblies to accommodate variations in foliation. For example, sometimes, all nozzles within a group may not be required to be open. As a result, such systems may underspray and/or overspray the foliage even when utilizing the sensors. In addition, the systems may increase the time required to spray the foliage because the controller performs calculations based on the sensor readings during operation of the system.

Accordingly, a foliage spray system that is capable of determining desired nozzle or valve operating parameters based on the position of the nozzles relative to the foliage is particularly useful.

BRIEF SUMMARY

In one aspect, a system for applying agricultural fluid to a target includes a fluid supply line connected to a fluid supply, a plurality of nozzle assemblies connected in fluid communication with the fluid supply line, and a plurality of electrically actuated valve assemblies. The nozzle assemblies are positioned and oriented to spray portions of the target. Each valve assembly of the plurality of electrically actuated valve assemblies is connected in fluid communication between the fluid supply line and a corresponding one of the plurality of nozzle assemblies to control fluid flow through the respective nozzle assembly. The system also includes a controller communicatively connected to the valve assemblies and configured to control at least one operating parameter of each valve assembly, and a portable electronic device connected in communication with the controller. The portable electronic device includes a user interface. The portable electronic device is configured to retrieve a stored user profile including at least one prestored value that relates to a physical characteristic of the system or an operating parameter of the system, and populate at least one user input field of the user interface with the at least one prestored value. At least one of the controller and the portable electronic device is configured to retrieve the stored user profile and determine the at least one operating parameter of each valve assembly based on the physical characteristic of the system or the operating parameter of the system.

In another aspect, a method of applying agricultural fluid to a target includes positioning a spray apparatus within a field including the target. The spray apparatus includes a fluid supply line, a plurality of nozzle assemblies connected in fluid communication with the fluid supply line, and a plurality of electrically actuated valve assemblies. The nozzle assemblies are positioned and oriented to spray portions of the target. Each valve assembly of the plurality of electrically actuated valve assemblies is connected in fluid communication between the fluid supply line and a corresponding one of the plurality of nozzle assemblies to control fluid flow through the respective nozzle assembly. A controller is communicatively connected to the valve assemblies and configured to control at least one operating parameter of each valve assembly. The method also includes retrieving, using a portable electronic device connected in communication with the controller, a stored user profile including at least one prestored value that relates to a physical characteristic of the system or an operating parameter of the system. The method further includes populating, via a user interface of the portable electronic device, at least one user input field with the at least one prestored value, and determining, using at least one of a controller and the portable electronic device, the at least one operating parameter of each valve assembly based on the physical characteristic of the system or the operating parameter of the system.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

Systems and methods disclosed herein facilitate application of agricultural fluids to plants, particularly in orchards or groves. For example, embodiments of the systems and methods facilitate dispensing fluid towards foliage of a plant according to a relative amount or density of the foliage and orientation of the nozzle assemblies dispensing the fluid. Particular embodiments of the systems and methods disclosed herein enable a user to capture an image of a spray apparatus adjacent a plant (e.g., a tree or vine in an orchard or grove), and identify a relative position and orientation of each nozzle assembly on the spray apparatus. Systems of the present disclosure are configured to determine a relative overlap amount of a spray path projection of each nozzle assembly and the foliage of the plant in the image, and determine an operating parameter (e.g., a duty cycle) of each valve assembly based on the relative overlap amount of the corresponding nozzle assembly. In some embodiments, a user identifies the foliage overlap amount of each nozzle assembly's spray path projection in the image. In other embodiments, systems of the present disclosure may be configured to automatically determine the overlap amount using image recognition software or techniques. By determining the operating parameter of each valve assembly on a spray apparatus based on relative overlap amounts between the associated nozzle assembly's spray path projection and foliage to which fluid is being applied, the systems of the present disclosure facilitate improving the effectiveness and reducing the time of agricultural spraying operations.

Figure 1:
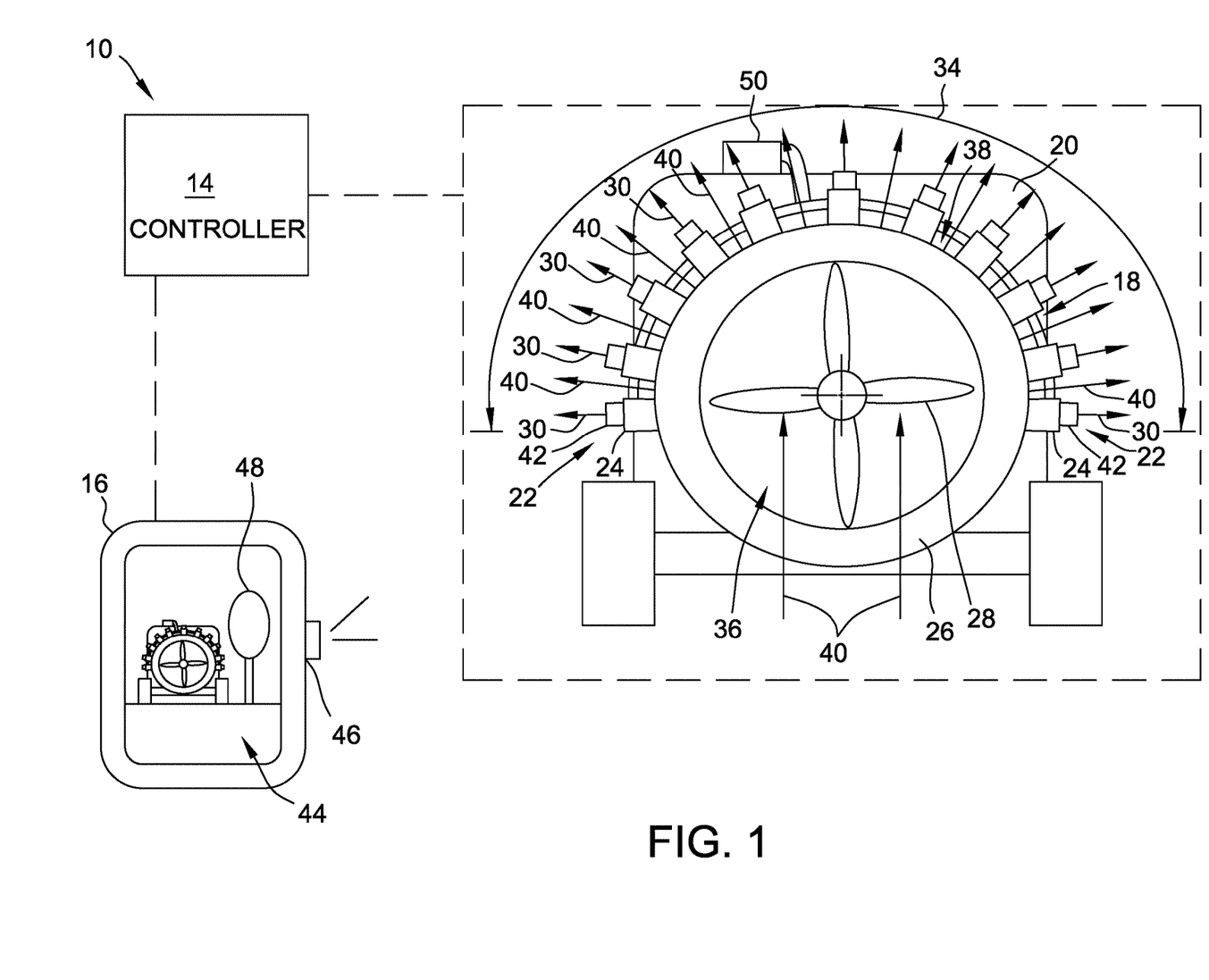
FIG. 1 is a schematic end view of an example fluid application system for spraying foliage.

FIG. 1 is a schematic end view of an example fluid application system, designated in its entirety by the reference number 10. In the example embodiment, fluid application system 10 includes a spray apparatus 12, a controller 14, and a portable electronic device 16. Unless otherwise noted, directions, such as horizontal and vertical, refer to the orientation of the fluid application system 10 shown in FIG. 1.

Spray apparatus 12 includes a manifold 18, a fluid supply or reservoir 20, a plurality of nozzle assemblies 22, a plurality of valve assemblies 24, a frame 26, and a fan or blower 28. Spray apparatus 12 is supported on a chassis including a plurality of wheels that allow spray apparatus 12 to be moved along the ground. Spray apparatus 12 may be coupled to a vehicle configured to move spray apparatus 12 along the ground. Spray apparatus 12 may receive mechanical and/or electrical power from the vehicle and/or may have its own power source, such as an engine. In further embodiments, spray apparatus 12 may be self-propelled and/or configured to operate at a fixed location.

In the example, spray apparatus 12 is an air blast sprayer in which fluid emitted from nozzle assemblies 22 is propelled by airflow generated by fan 28. Accordingly, fluid application system 10 may be used as an agricultural sprayer, e.g., an orchard sprayer, for spraying crops. Such crops may define a canopy at a distance above the ground. In other embodiments, spray apparatus 12 may have any configuration suitable for spraying fluid onto plants. For example, in some embodiments, spray apparatus 12 may be configured as, without limitation, an air blast sprayer, an herbicide sprayer, a vineyard sprayer, an over-the-row boom sprayer, a fan sprayer, a vertical or tower sprayer, and a small batch sprayer.

Further, in the example embodiment, fluid reservoir 20 holds a quantity of material 30, such as, and without limitation, a liquid, a mixture of liquid and powder, and/or other material, to be dispensed by fluid application system 10, for example, onto a crop. In some embodiments, material 30 may be water or an agrochemical such as an herbicide or a pesticide, and may be dispensed by nozzle assemblies 22 onto, for example, the crop and/or the ground. The quantity of material 30 held in fluid reservoir 20 generally flows through manifold 18 to nozzle assemblies 22. For example, a pump assembly 50 may be configured to selectively draw a flow of material 30 from reservoir 20 through an inlet conduit and pressurize the flow of material 30. The terms "pipe" and "conduit," as used herein, include any type of tube made of any suitable material such as metal, rubber, or plastic, for channeling material 30 therethrough.

Manifold 18 includes a fluid supply line or pipe 32 connected to fluid reservoir 20 and supported by frame 26. Manifold 18 has a length 34 and nozzle assemblies 22 are positioned along length 34 of manifold 18. In the example, manifold 18 is curved and nozzle assemblies 22 are spaced circumferentially along manifold 18 and are positioned on manifold 18 such that fluid emitted from nozzle assemblies 22 is directed radially outward from spray apparatus 12. In other embodiments, spray apparatus 12 may include any manifold 18 that enables spray apparatus 12 to operate as described. In yet other embodiments, nozzle assemblies 22 may be mounted to frame 26 at suitable locations and orientations to produce a desired spray pattern. In such embodiments, nozzle assemblies 22 may be connected to manifold 18 by suitable flow conduits, such as hoses or pipes.

In the example embodiment, frame 26 is cylindrical and extends about fan 28. In addition, frame 26 defines a central inlet 36 and at least one outlet 38 extending circumferentially about fan 28. Fan 28 is configured to rotate and, thereby generate an airstream 40. Specifically, airstream 40 is drawn into inlet 36 and redirected radially outward from fan 28 through outlet 38. Nozzle assemblies 22 are positioned proximate outlet 38 within the path of airstream 40. Accordingly, fluid emitted from nozzle assemblies 22 is carried by airstream 40. Notably, the direction and orientation of nozzle assemblies 22 relative to the direction of airstream 40 affects the fluid flow characteristics of fluid carried by airstream 40. As described herein, nozzle assemblies 22 may be operated to provide desired fluid flow characteristics based on the orientation and position of nozzle assemblies 22. For example, fluid application system 10 may facilitate control of characteristics of the fluid, e.g., pressure, flow rate, and droplet size, based on the orientation and position of nozzle assemblies 22. As a result, fluid application system 10 may facilitate providing desired application rates to the crops adjacent the ground and in the canopy.

In the example embodiment, each nozzle assembly 22 includes a nozzle body and a spray nozzle 42. Spray nozzle 42 may have any suitable nozzle configuration known in the art, for example, and without limitation, spray nozzle 42 may include a spray tip (not shown), such as a flat fan tip, cone tip, straight stream tip and/or any other suitable spray tip that enables nozzle assembly 22 to function as described herein. Similarly, valve assembly 24 may generally have any suitable valve configuration known in the art, for example, and without limitation, a latching solenoid valve, 2WNC solenoid valve, pilot actuated solenoid valve, flipper solenoid valve, and/or the like.

In the example embodiment, valve assembly 24 is a direct acting solenoid valve that includes an actuator configured to pulse with a timing, duration, frequency, and duty cycle determined by controller 14. In some embodiments, the pulse timing, duration, and/or frequency are suitable to reduce dynamic effects of pulsing on the upstream system pressure and flow, therefore creating a controlled variable resistance to flow. In alternative embodiments, valve assembly 24 may be pneumatically or hydraulically actuated. The term "duty cycle," as used herein, refers to the cycle of operation of the valve assembly operating intermittently rather than continuously and includes the percentage of time the valve assembly is open divided by the total operation time. The duty cycle controls the flow rate or emission rate of material 30 through nozzle assembly 22 in a rapid on/off manner. Each valve assembly 24 is connected in fluid communication between the fluid supply line 32 and a corresponding one of the plurality of nozzles assemblies 22 to control fluid flow through the respective nozzle assembly. In some embodiments, valve assembly 24 is configured to be mounted to and/or integrated within a portion of spray nozzle 42.

In one embodiment, controller 14 is configured to regulate the timing and duration of valve assembly 24 to control the phasing between nozzles assemblies 22 to facilitate reducing harmonics and/or vibrations of manifold 18. For example, the phasing and or timing of nozzle assemblies 22 can be regulated to facilitate reducing and/or eliminating water hammering in fluid supply line 32. The phrase "water hammering" as used herein includes a sudden change in flow of material 30, which can result in shock waves propagating through fluid application system 10. Flow changes can occur due to operation of nozzles assemblies 22, starting and stopping of a pump assembly, and/or directional changes caused by fittings between nozzles assemblies 22 and manifold 18, for example.

In one particular embodiment, valve assembly 24 may be configured the same as or similar to the valves disclosed in U.S. Pat. No. 9,435,458 (the '458 patent), filed on Mar. 2, 2012, and entitled "Electrically Actuated Valve for Control of Instantaneous Pressure Drop and Cyclic Durations of Flow," which is incorporated by reference herein in its entirety for all purposes. Specifically, the '458 patent discloses a solenoid valve in which the valve poppet is configured to be pulsed such that the cyclic durations of the poppet control the average flow rate through the valve. For example, the valve may be operated with a pulse-width modulation, in which the poppet moves from a sealed position to an open position relative to the valve inlet and/or valve outlet and the duty cycle of the pulse controls the average flow rate. Additionally, the pressure drop across the valve may be controlled during each pulse of the poppet by regulating the position to which the poppet is moved relative to the valve inlet and/or the valve outlet. For instance, the displacement of the poppet may be regulated such that the valve is partially opened during each pulse.

In the example embodiment, spray nozzle 42 includes a nozzle body portion, which receives material 30 flowing through fluid supply line 32, and a nozzle head attached to and/or formed integrally with the nozzle body portion. The nozzle head is configured for emitting material 30 from nozzle assembly 22 onto the crop and/or the ground.

In the illustrated embodiment, valve assemblies 24 are coupled in communication with controller 14. In particular, each actuator of each valve assembly 24 is coupled in communication with controller 14. Controller 14 controls one or more operating parameters of each valve assembly 24, for example, and without limitation, a timing, a duration, a duty cycle percentage, and/or a pulse frequency of the valve assembly. In one embodiment, valve assembly 24 has an operational frequency in the range of between and including about 0 Hertz (Hz) and about 15 Hz, and can have a duty cycle in the range between and including 0% to 100%.

In one particular embodiment, controller 14 may be configured the same as or similar to the controller disclosed in U.S. Pat. No. 8,191,795 (the '795 patent), filed on Jul. 31, 2009, and entitled "Method and System to Control Nozzles While Controlling Overall System Flow and Pressure," which is incorporated by reference herein in its entirety for all purposes. Specifically, the '795 patent discloses using a "flow factor" for individually scaling fluid flow from each valve assembly 24. For example, the controller is configured to control the rate at which the liquid agricultural product is emitted from each valve based upon the calculated flow factor for each valve.

As described above, in the example embodiment, controller 14 is configured to regulate the overall application rate of material 30 by fluid application system 10 to achieve predetermined flow and pressure objectives while regulating or controlling the individual flow of each individual nozzle assembly 22 to achieve a specific distribution of material 30 across the plurality of nozzle assemblies 22. More particularly, controller 14 is configured to receive various input data, including, for example, and without limitation, flow rate data, a target application rate for material 30 (e.g., gallons per acre), nozzle droplet spectra data, a fluid pressure within fluid supply line 32, and a ground speed at which fluid application system 10 is being moved across a surface. Controller 14 may be configured to receive the target application or flow rate information based on, e.g., a user input target application rate input at a user input device (e.g., portable electronic device 16).

In some embodiments, for example, as the ground speed of spray apparatus 12 increases, controller 14 increases a flow rate of material 30 through fluid application system 10 to maintain the target application rate. Similarly, as the ground speed of spray apparatus 12 decreases, controller 14 decreases a flow rate of material 30 through fluid application system 10 to maintain the target application rate.

Controller 14 is configured to control at least one operating parameter of each of the plurality of valve assemblies 24. For example, controller 14 is configured to control a duty cycle of each valve assembly 24. In alternative embodiments, controller 14 may be configured to control operating parameters of any components of fluid spray apparatus 12.

Portable electronic device 16 is communicatively coupled to controller 14 and is configured to send signals to and receive signals from controller 14. In the example, portable electronic device 16 and controller 14 are connected by a wireless connection. In some embodiments, portable electronic device 16 and controller 14 may be connected by a wired connection. In other embodiments, portable electronic device 16 and controller 14 may be connected in any suitable manner. For example, in some embodiments, at least one relay or data storage device may be used to transfer information between controller 14 and portable electronic device 16.

In the example, portable electronic device 16 and controller 14 are shown as separate devices. In other embodiments, portable electronic device 16 and controller 14 may be incorporated in a single device. For example, portable electronic device 16 and controller 14 may be included in a computing device mounted to a portion of fluid application system 10.

Portable electronic device 16 may be any suitable computing device. For example, portable electronic device 16 may be, without limitation, a tablet computing device, a cellular telephone device, a laptop computing device, and any other suitable computing device. Suitably, the portable electronic device 16 is a handheld device.

In the example embodiment, portable electronic device 16 includes a user interface 44. User interface 44 is configured to present or display information to a user of portable electronic device 16, and to receive user input, for example, relating to operation of fluid application system 10. In some embodiments, user interface 44 includes a presentation interface or display screen (e.g., a monitor, LCD screen, or touch screen) that presents or displays information to a user of portable electronic device 16, and an input device (e.g., a keyboard, a mouse, or a touch screen) that receives the user input. In some embodiments, such as the illustrated embodiment, the presentation interface and the input device are integrated into a single device, such as a touch screen. In some embodiments, user interface 44 is configured to generate or display a graphical user interface for presenting information to a user and receiving user input. The graphical user interface may be implemented as a downloadable application and/or a website. In such embodiments, users of fluid application system 10 may use their own, individual portable electronic devices 16 (e.g., smartphones or tablets) with fluid application system 10, rather than a dedicated electronic device for fluid application system 10.

In the illustrated embodiment, portable electronic device 16 also includes a camera 46 configured to capture one or more images, for example, of spray apparatus 12 and foliage and/or plants. Camera 46 may be any suitable camera capable of capturing images for display on user interface 44 of portable electronic device 16. In the example embodiment, fluid application system 10 is compatible with any portable electronic device 16 that includes user interface 44 and camera 46. In other embodiments, fluid application system 10 is compatible with portable electronic devices that do not include camera 46.

Portable electronic device 16 is configured to generate or display at least one image of foliage 48 and at least a portion of spray apparatus 12. In particular, portable electronic device 16 is configured to display an image that includes foliage 48, and at least a portion of spray apparatus 12, such as nozzle assemblies 22 or a portion of spray apparatus 12 to which nozzle assemblies 22 are mounted. As described herein, portable electronic device 16 is configured to identify or receive user input identifying the location and orientation of nozzle assemblies 22 and relate projected spray paths of nozzle assemblies 22 to foliage 48 using the image. In addition, at least one of controller 14 and portable electronic device 16 is configured to determine at least one operating parameter of valve assemblies 24 based on the image. In other embodiments, portable electronic device 16 may be configured to generate any suitable images. For example, in some embodiments, a plurality of images is overlaid to determine a relationship between spray apparatus 12 (e.g., spray path projections of nozzle assemblies 22) and foliage 48.

Although certain functions, determinations, and/or calculations are described herein as being performed by one of controller 14 and portable electronic device 16, it should be understood that such functions, determinations, and/or calculations may be performed by either controller 14 or portable electronic device 16, and further, that such functions, determinations, and/or calculations may be distributed between controller 14 or portable electronic device 16.

Figure 2:
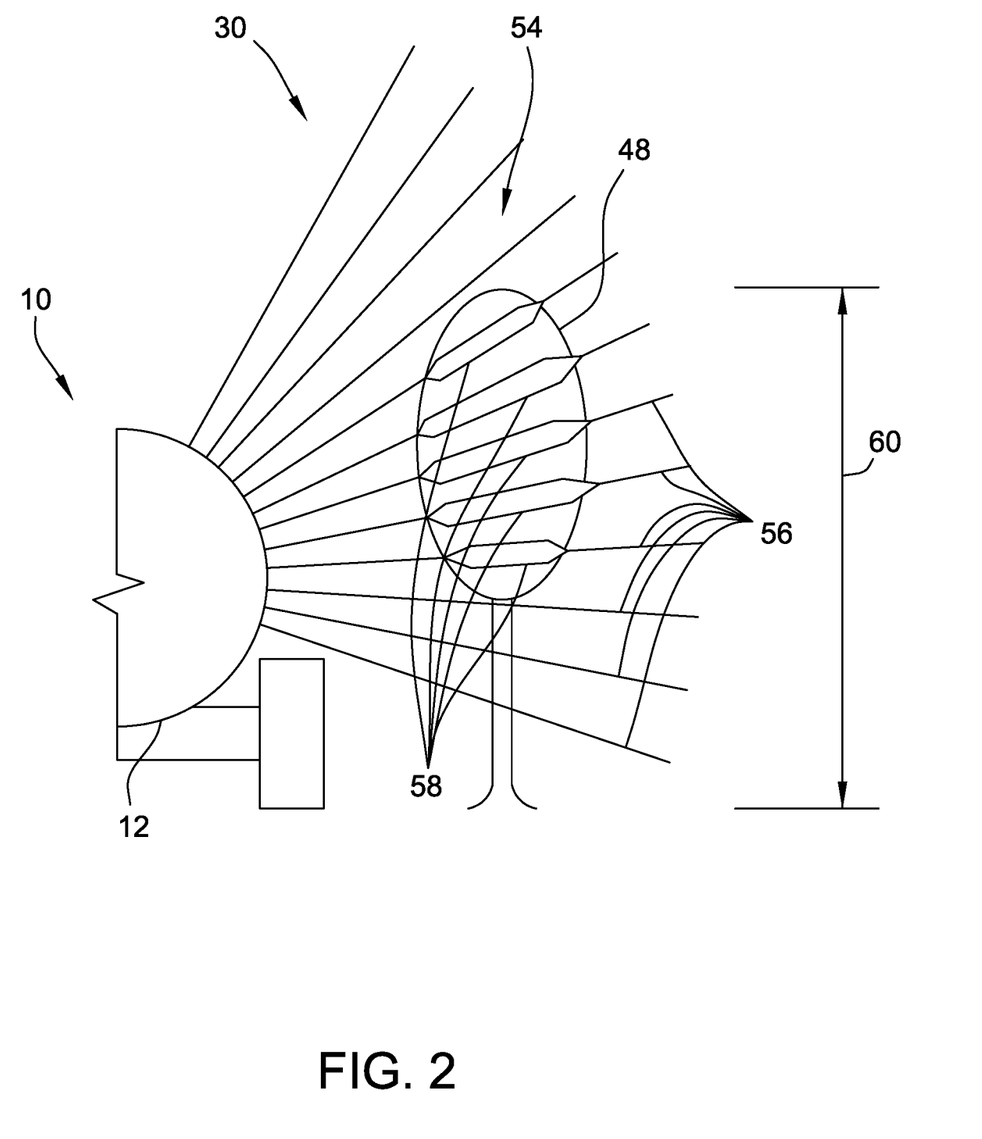
FIG. 2 is a schematic view of the fluid application system adjacent foliage of a plant.
Figure 3:
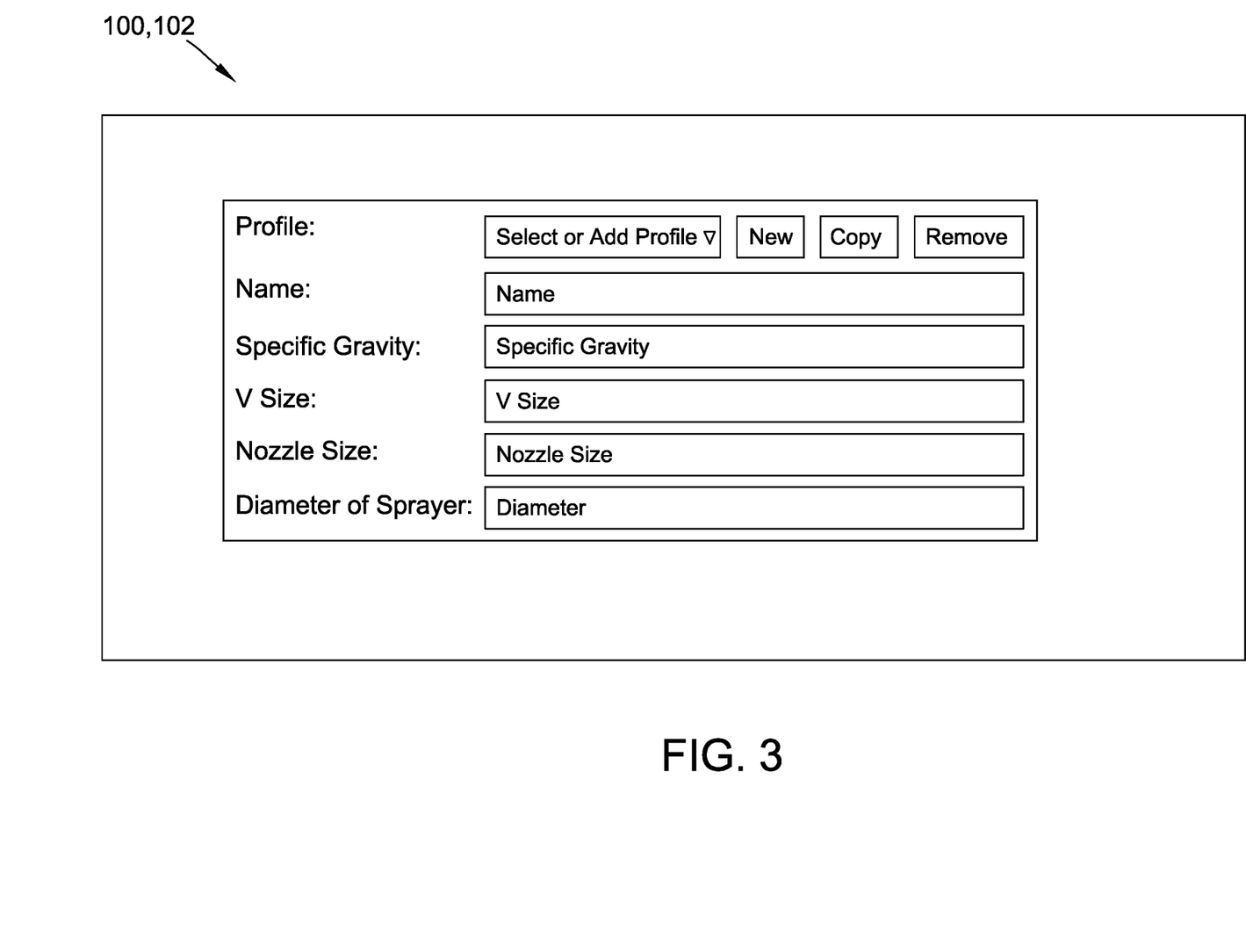
FIGS. 3-7 are views of an example graphical user interface of a portable electronic device of the fluid application system.

FIG. 2 is a schematic view of fluid application system 10 adjacent foliage 48 of a plant 54. Nozzle assemblies 22 (FIG. 1) are located and oriented to spray material 30 onto foliage 48. Spray path projections 56 show the projected path of material 30 from each nozzle assembly 22. As shown in FIG. 2, at least some spray path projections 56 overlap a portion of foliage 48 by an overlap amount 58. As described herein, the overlap amount 58 of spray path projections 56 may be used to determine a relative amount of fluid to be dispensed from each nozzle assembly 22 for application to foliage 48. As shown in FIG. 2, some spray path projections 56 may not overlap foliage 48.

With reference to FIGS. 1 and 2, portable electronic device 16 may identify the location and orientation of nozzle assemblies 22 on the image and generate spray path projections 56 based on the location and orientation of nozzle assemblies 22. In some embodiments, the location and orientation of nozzle assemblies 22 is input by a user, for example, using user interface 44. In other embodiments, controller 14 and/or portable electronic device 16 may identify the position and/or orientation of nozzle assemblies 22 autonomously.

To facilitate determining spray path projections 56 and overlap amounts 58, controller 14 and/or portable electronic device 16 may determine a relationship between the size and position of foliage 48 and the size and position of spray apparatus 12. For example, a height 60 of plant 54 including foliage 48 may be determined based on a known dimension of spray apparatus 12, such as a width. The dimension of spray apparatus 12 may be input into portable electronic device 16 by a user. The relative positions of spray apparatus 12 and foliage 48 may be used to increase the accuracy of the determined spray path projections 56 and overlap amounts 58.

At least one of controller 14 and portable electronic device 16 is configured to determine an operating parameter of valve assemblies 24 based on spray path projections 56 and overlap amounts 58 in the image. For example, a duty cycle of each valve assembly 24 may be determined based on spray path projection 56 and a relative overlap amount 58 of the nozzle assembly 22 corresponding to valve assembly 24. In one embodiment, for example, the lengths of all overlap amounts 58 may be summed to determine a total overlap amount of all spray path projections 56, and each individual overlap amount 58 may be divided by the total overlap amount to determine a relative or normalized overlap amount for each nozzle assembly 22. The relative overlap amount may be used to determine a duty cycle for the valve assembly 24 that corresponds to the respective nozzle assembly 22. The relative overlap amount may be proportional to the duty cycle and/or may be multiplied by a ratio to determine the operating duty cycle. In some embodiments, portable electronic device 16 is configured to determine the operating parameter for each valve assembly 24 and communicate the operating parameter to controller 14, which controls operation of each valve assembly 24 according to the determined operating parameter. In other embodiments, controller 14 determines the operating parameter for each valve assembly 24 based on information received from portable electronic device 16, such as the position and orientation of nozzle assemblies 22 and the overlap amount 58 of each nozzle assembly 22. In yet other embodiments, the operating parameter for each valve assembly 24 may be determined in any suitable manner.

In this embodiment, once the operating parameters for valve assemblies 24 are determined, the operating parameters remain fixed during application of fluid to a row of plants or to an entire field. In other embodiments, one or more operating parameters of valve assemblies 24 may be varied in real time based on foliage 48 as the spray apparatus 12 travels along a row or through a field.

FIGS. 3-7 are views of an example graphical user interface 100 that may be displayed on user interface 44 of portable electronic device 16 (shown in FIG. 1). Graphical user interface 100 includes a series of windows 102, 104, 106, 108 that allow a user to receive and input information. Graphical user interface 100 may be hosted on a website (e.g., either locally on controller 14 or accessible via the Internet) that allows a user to access graphical user interface 100 using any portable electronic device 16 (shown in FIG. 1) that is connected to the Internet and/or controller 14. In other embodiments, graphical user interface 100 may be at least partially stored (e.g., as computer executable instructions or software) on portable electronic device 16.

In the example embodiment, graphical user interface 100 allows a user to input values corresponding to fluid application system 10. For example, window 102 includes a plurality of input fields that allows a user to input physical characteristics of fluid application system 10 such as, without limitation, a specific gravity of material 30 (shown in FIG. 1) to be applied, a size of valve assemblies 24, a size of nozzle assemblies 22, and a dimension of manifold 18 ("diameter of sprayer"). In other embodiments, user interface 100 may receive any user input that allows fluid application system 10 to operate as described herein.

In some embodiments, graphical user interface 100 may allow a user to store and load a profile that includes pre-stored physical characteristics of a spray apparatus, and allow users to repeatedly use the same settings without reentering the values. In addition, graphical user interface 100 may include a default profile. In other embodiments, graphical user interface 100 may include any suitable profiles.

Figure 4:
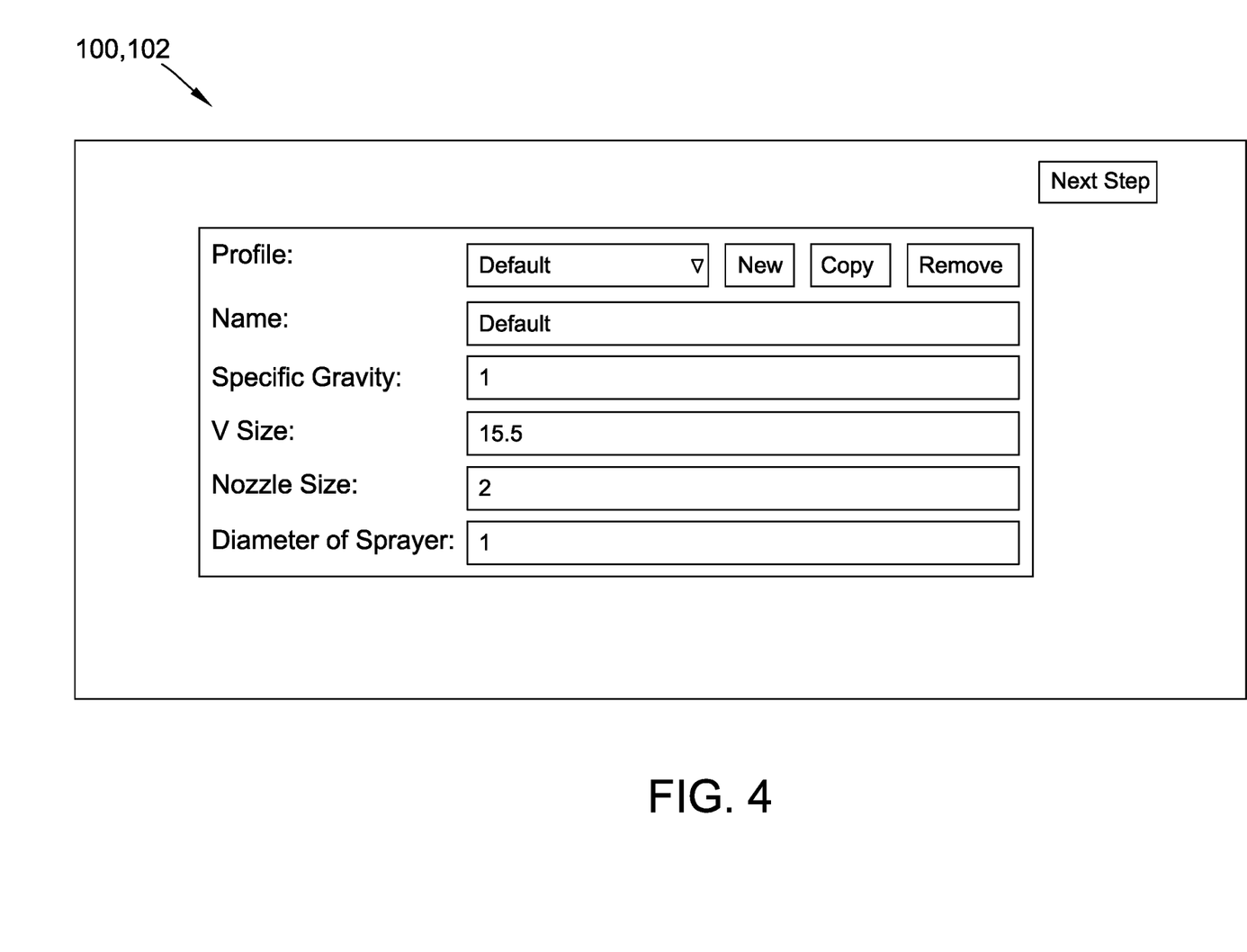

FIG. 4 illustrates window 102 with the input fields populated with example values. For example a "Default" profile has been selected from a profile selection drop down menu. The Default profile has the following pre-stored values populated in the input fields of window 102:
specific gravity: 1
valve assembly size: 15.5
nozzle assembly size: 2
diameter of sprayer: 1

Figure 5:
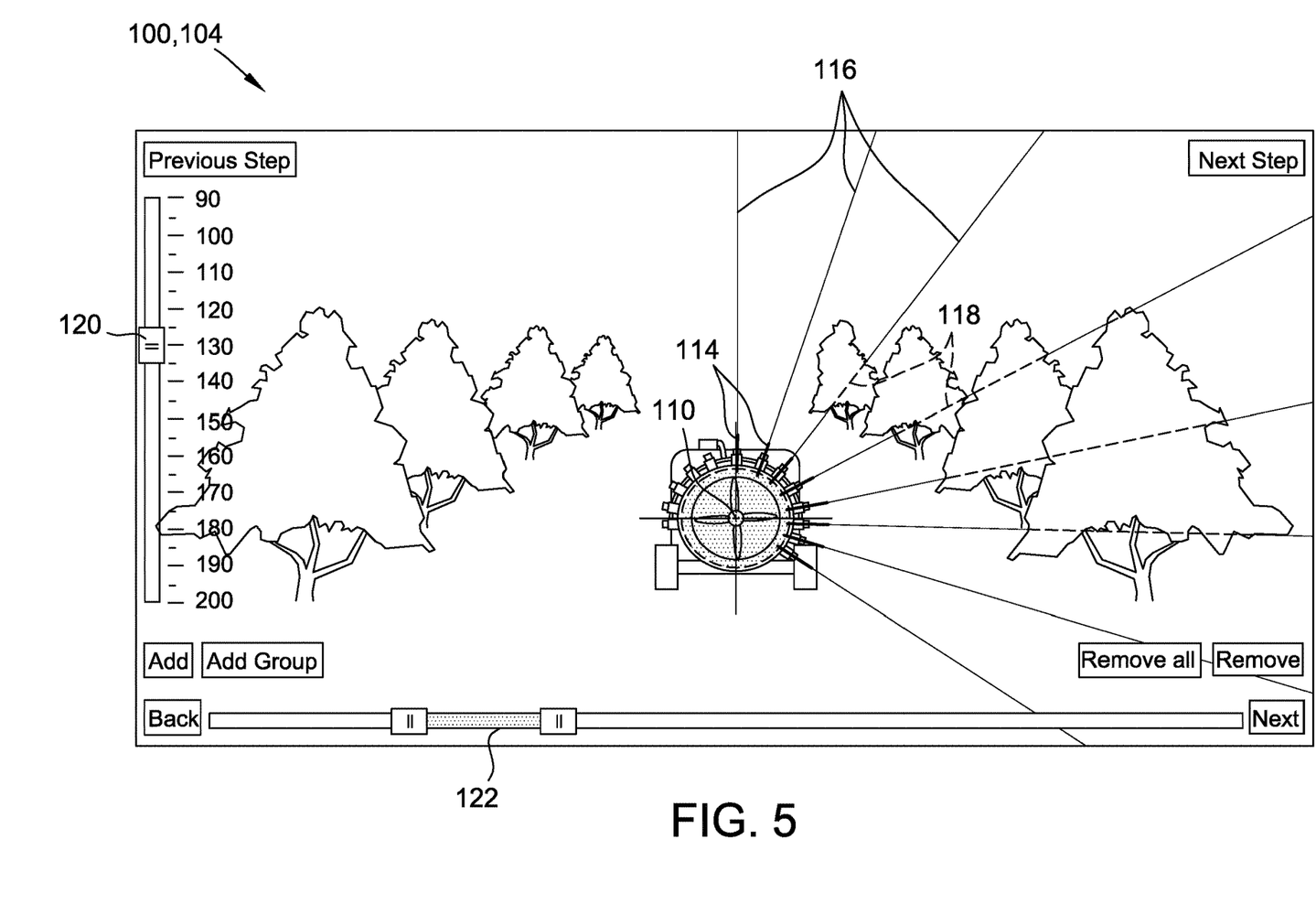
Figure 6:
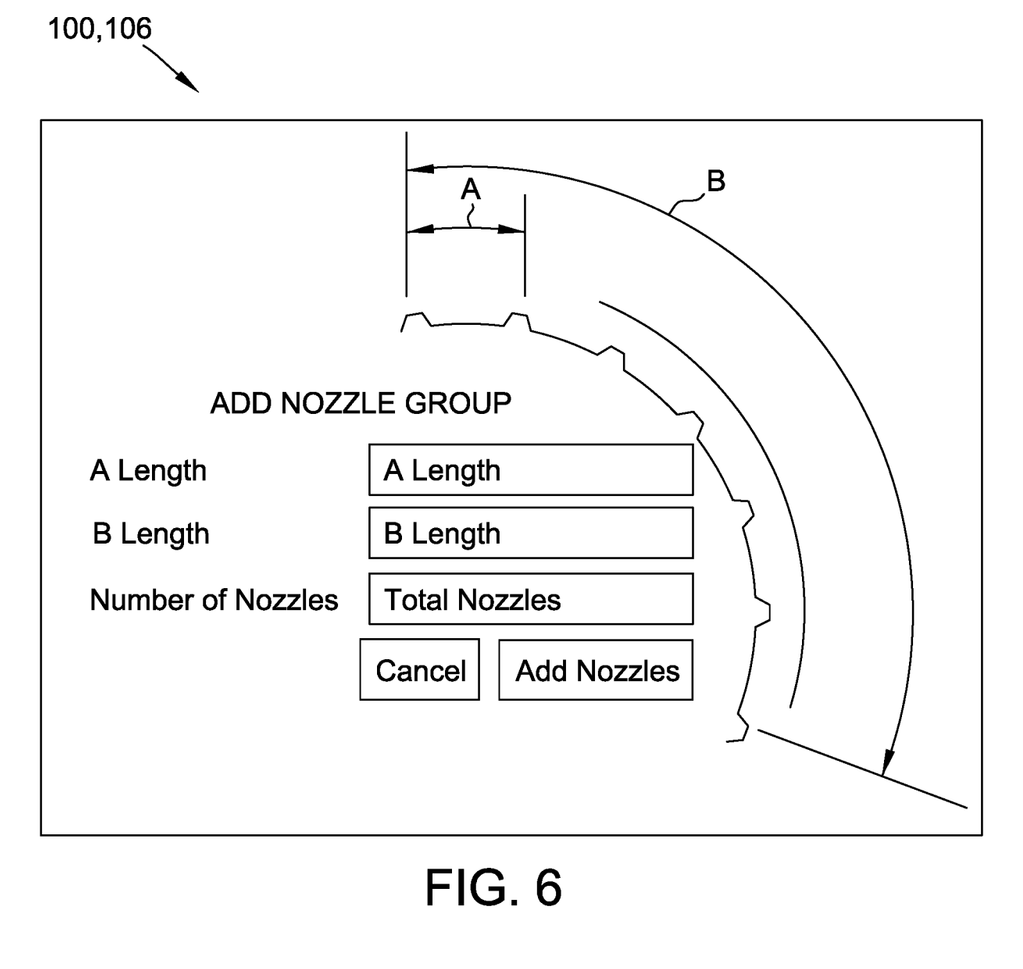

Referring to FIGS. 2 and 5, in the example embodiment, once the input fields of window 102 (shown in FIG. 4) are populated, graphical user interface 100 generates an image in window 104 that includes a photographic image of spray apparatus 12 and foliage 48, as well as graphical elements overlaid on the photographic image to facilitate identifying the position and orientation of nozzle assemblies 22, spray path projections 56 of nozzle assemblies 22, and overlap amounts 58 of spray path projections 56. The photographic image displayed in window 104 may be captured by camera 46 or may be uploaded onto portable electronic device 16. In the example embodiment, graphical user interface 100 allows a user to access camera 46 and capture the image in real time.

In the example embodiment, the graphical elements displayed or overlaid on the photographic image include cross-hairs 110 used to identify a central location of spray apparatus 12, nozzle assembly markers 114 that display the location and orientation of nozzle assemblies 22 on spray apparatus 12 based on user inputs, spray path projection lines 116 that indicate the spray path projection 56 for each of the identified nozzle assemblies 22, and overlap amount lines 118 that indicate the overlap amount 58 for each spray path projection 56.

In the example embodiment, a user positions the cross-hairs 110 on an object in the image, such as the central location of spray apparatus 12, by dragging and dropping the cross-hairs 110 to the desired location. The outer boundary or size of the cross-hairs 110 may be adjusted to match a size of the spray apparatus 12 displayed on the photographic image using suitable input elements, such as graphical sliders that adjust the horizontal and vertical dimensions of the cross-hairs 110.

Further, in the example embodiment, a user identifies nozzle assemblies 22 on the photographic image by adding individual nozzle assemblies 22 or groups of nozzle assemblies 22 (e.g., by using window 106 shown in FIG. 6) by entering one or more position values of each nozzle assembly or group. For example, the position values of nozzle assemblies 22 may be entered using graphical user interface 100 as radial ordinances of the nozzle assembly along the outer circumferential boundary of cross-hairs 110. As the values for nozzle assemblies 22 are entered, window 104 generates and displays nozzle assembly markers 114 for each nozzle assembly 22 to facilitate identifying where nozzle assemblies 22 have already been identified. Additionally, in the example embodiment, window 104 includes a vertical slider bar 120 to facilitate adjusting the position of individual nozzle assemblies 22. For example, once a nozzle assembly marker 114 is displayed in window 104, the circumferential position of the nozzle assembly marker 114 may be adjusted by sliding slider bar 120 up or down. In other embodiments, graphical user interface 100 may include other graphical input elements to facilitate identifying and/or adjusting the position of nozzle assemblies 22.

Additionally, in the example embodiment, spray path projection lines 116 are displayed on the photographic image in window 104 as the location and orientation of each nozzle assembly 22 is identified on the photographic image. In the example embodiment, each spray path projection line 116 emanates from a distal end of a corresponding nozzle assembly marker 114, and extends radially outward to the edges of the photographic image.

Further, in the example embodiment, window 104 displays overlap amount lines 118 along spray path projection lines 116 that overlap a portion of foliage 48. Overlap amount lines 118 generally correspond to the overlap amount 58 of spray path projection lines 116 and the foliage displayed on the photographic image. Overlap amount lines 118 are displayed with a contrasting appearance relative to spray path projection lines 116 such that overlap amount lines 118 can be distinguished from spray path projection lines 116. In the example embodiment, overlap amount lines 118 are displayed in a color (e.g., teal) that contrasts with the color in which the spray path projection lines 116 are displayed (e.g., blue).

In some embodiments, overlap amount lines 118 are generated automatically by portable electronic device 16 using suitable image recognition software and/or techniques. In other embodiments, overlap amount lines are generated in response to user input. In the example embodiment, window 104 includes a horizontal slider bar 122 that allows a user to adjust the starting point, the ending point, and the length of each overlap amount line 118.

Figure 7:
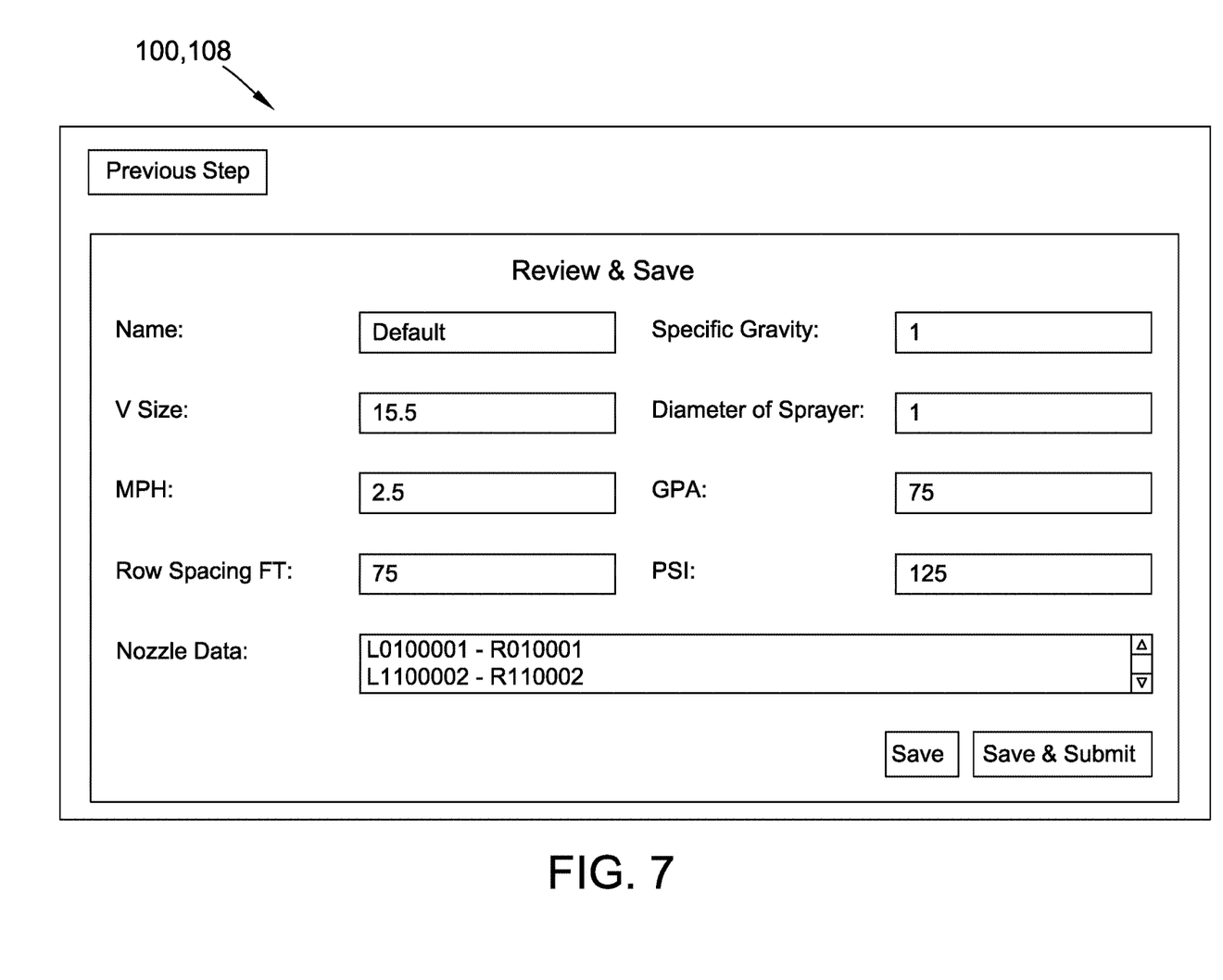

As shown in FIG. 7, additional operating parameters of fluid application system 10 may be input using window 108 of graphical user interface 100. In the illustrated embodiment, for example, a travel speed of spray apparatus 12 ("MPH), a desired application rate ("GPA"), the row spacing between adjacent rows of plants ("Row Spacing FT"), and a target or set point operating pressure of spray apparatus 12 ("PSI") are input using window 108 of graphical user interface 100.

Based on the information input via graphical user interface 100, controller 14 (shown in FIG. 1) and/or portable electronic device 16 (shown in FIG. 1) determines operating parameters of fluid application system 10 (shown in FIG. 1), such as an operating duty cycle for each valve assembly 24 (shown in FIG. 1). In some embodiments, the operating values are sent to controller 14 (shown in FIG. 1) and controller 14 operates fluid application system 10 (shown in FIG. 1) based on the determined values. In other embodiments, the operator adjusts nozzle assemblies 22 (shown in FIG. 1) and/or valve assemblies 24 (shown in FIG. 1) based on the values determined by portable electronic device 16 (shown in FIG. 1).

Figure 8:
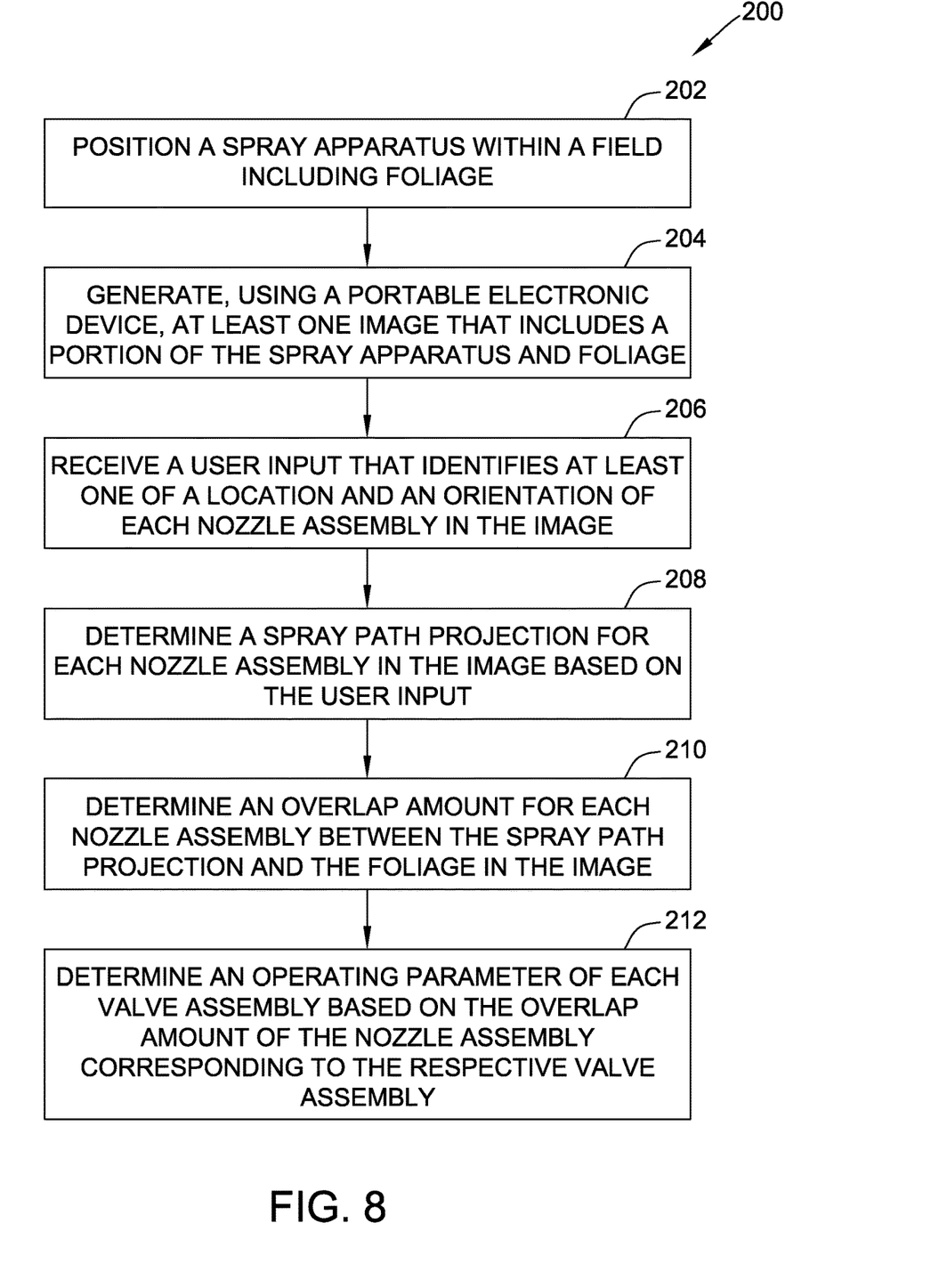
FIG. 8 is a flow diagram of an example method of applying agricultural fluid to foliage.

FIG. 8 is a flow diagram of an example method 200 of applying agricultural fluid to foliage. With reference to FIGS. 1, 2, and 8, method 200 includes positioning 202 spray apparatus 12 within a field including foliage 48 and generating or displaying 204, using portable electronic device 16, at least one image that includes a portion of spray apparatus 12 and foliage. The portion of spray apparatus 12 displayed in image may include nozzle assemblies 22 or a portion of spray apparatus 12 (e.g., manifold 18 or frame 26) to which nozzle assemblies 22 are mounted.

In addition, method 200 includes receiving 206 a user input that identifies at least one of a location and an orientation of each nozzle assembly 22 in the image. For example, nozzle assemblies 22 may be identified by radial ordinances about a center cross hair that a user positions on spray apparatus 12 in the image. In other embodiments, the user may identify nozzle assemblies 22 in any suitable manner. For example, in some embodiments, a user may touch or tap the image to identify locations of the nozzle assemblies 22, and slide or drag on a touch screen of portable electronic device 16 to indicate the orientations of nozzle assemblies 22 in the image. In some embodiments, nozzle assemblies 22 may not necessarily be located along a curve. In such embodiments, a Cartesian coordinate system may be used to identify the locations and orientations of nozzle assemblies 22.

Method 200 also includes determining 208 a spray path projection for each nozzle assembly 22 in the image based on the user input. Method 200 further includes determining 210 an overlap amount 58 between the spray path projection 56 and the foliage in the image for each nozzle assembly 22. In addition, method 200 includes determining 212 an operating parameter of each valve assembly based on the relative overlap amount of the spray path projection that corresponds to the nozzle assembly associated with the respective valve assembly. In some embodiments, determining 210 an overlap amount 58 includes determining a total overlap amount for the plurality of nozzle assemblies 22, and determining a relative or normalized overlap amount for each nozzle assembly by dividing the overlap amount of the respective nozzle assembly by the total overlap amount. The duty cycle of each valve assembly 24 may be determined based on the relative or normalized overlap amount of the nozzle assembly 22 that corresponds to the respective valve assembly 24.

In some embodiments, controller 14 controls fluid application system 10 based on the determined operating parameter. For example, in some embodiments, controller 14 individually actuates the plurality of valve assemblies to obtain a desired flow characteristic of fluid emitted from each nozzle assembly. The operating parameter may be any suitable operating parameter including, for example and without limitation, a duty cycle of each valve assembly 24.

Figure 9:
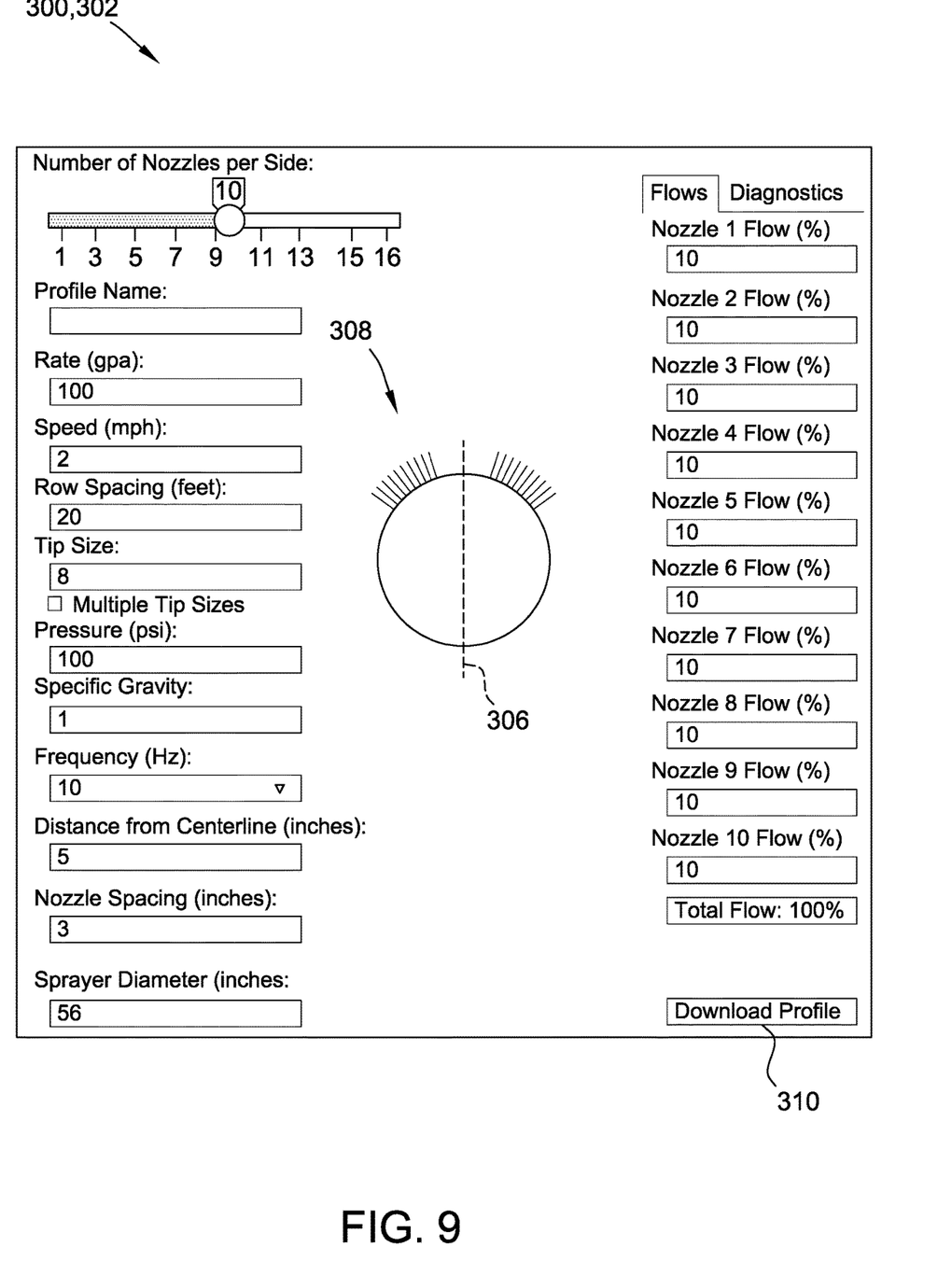
FIGS. 9 and 10 are views of an example graphical user interface for use with the fluid application system shown in FIG. 1.
Figure 10:
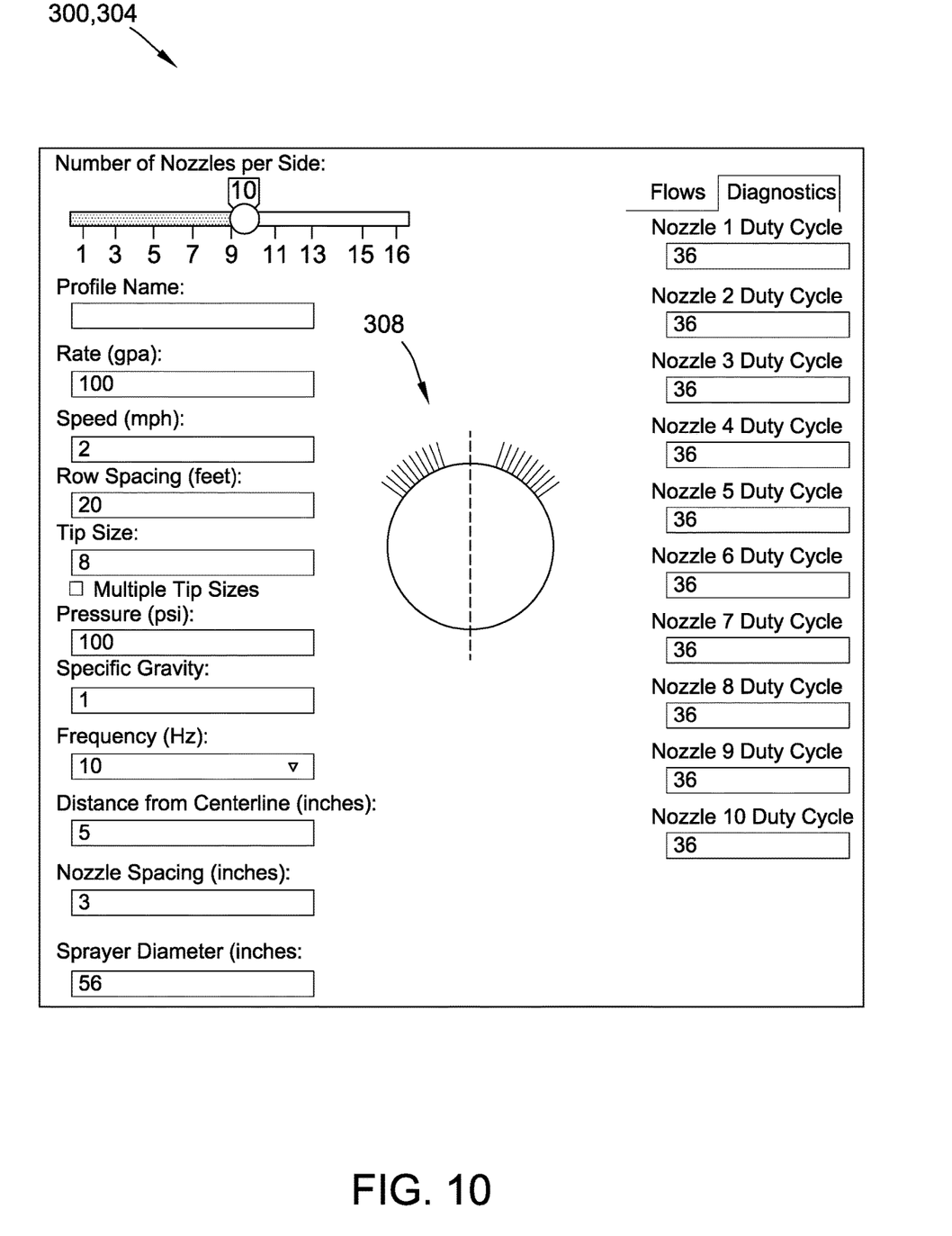

FIGS. 9 and 10 are views of an example graphical user interface 300 that may be displayed on user interface 44 of portable electronic device 16 (shown in FIG. 1). Graphical user interface 300 includes a series of windows 302, 304 that allow a user to receive and input information. Graphical user interface 300 may be hosted on a website (e.g., either locally on controller 14 or accessible via the Internet) that allows a user to access graphical user interface 300 using any portable electronic device 16 (shown in FIG. 1) that is connected to the Internet and/or on controller 14. In other embodiments, graphical user interface 300 may be at least partially stored (e.g., as computer executable instructions or software) on portable electronic device 16.

In the example embodiment, graphical user interface 300 allows a user to input values corresponding to fluid application system 10. For example, window 302 includes a plurality of input fields that allows a user to input physical characteristics and/or operating parameters of fluid application system 10 (shown in FIG. 1) such as, without limitation, a number of nozzle assemblies 22 (shown in FIG. 1) of fluid application system 10, a size of nozzle assemblies 22 ("tip size"), a specific gravity of material 30 (shown in FIG. 1) to be applied, a frequency of control signals provided to valve assemblies 24 ("Frequency (Hz)"), a distance of nozzle assemblies 22 from a centerline 306, a circumferential spacing between nozzle assemblies 22, and a spray diameter. Additional operating parameters of fluid application system 10 may be input using window 108 of graphical user interface 300. In the illustrated embodiment, for example, a travel speed of spray apparatus 12 ("speed (mph)"), a desired application rate ("Rate (gpa)"), the row spacing between adjacent rows of plants ("Row Spacing (feet)"), and a target or set point operating pressure of spray apparatus 12 ("Pressure (psi)") are input using window 302 of graphical user interface 300. In other embodiments, user interface 300 may receive any user input that allows fluid application system 10 to operate as described herein.

In some embodiments, graphical user interface 300 may allow a user to store and load a profile that includes pre-stored physical characteristics and/or operating parameters of a spray apparatus, and allow users to repeatedly use the same settings without reentering the values. In addition, graphical user interface 300 may include a default profile. In other embodiments, graphical user interface 300 may include any suitable profiles.

In the example embodiment, once the input fields of window 302, 304 are populated, graphical user interface 300 generates a schematic representation 308 in window 302, 304 that includes spray apparatus 12 and spray path projections 56 of nozzle assemblies 22. The graphical user interface 300 automatically generates the schematic representation 308 based on the information input by the user such as the number of nozzle assemblies 22, the spacing between nozzle assemblies 22, and the desired application rate.

Based on the information input via graphical user interface 300, controller 14 (shown in FIG. 1) and/or portable electronic device 16 (shown in FIG. 1) determines operating parameters of fluid application system 10 (shown in FIG. 1), such as an operating duty cycle for each valve assembly 24 (shown in FIG. 1). In some embodiments, the operating values are sent to controller 14 (shown in FIG. 1) and controller 14 operates fluid application system 10 (shown in FIG. 1) based on the determined values. In other embodiments, the operator adjusts nozzle assemblies 22 (shown in FIG. 1) and/or valve assemblies 24 (shown in FIG. 1) based on the values determined by portable electronic device 16 (shown in FIG. 1). The operating parameters may be saved as a profile and/or downloaded for use on controller 14 and/or portable electronic device 16 using the "Download Profile" button 310 in window 304.

As shown in FIG. 10, user interface 300 may provide diagnostic information based on the input values and/or the determined operating parameters. For example, window 304 includes diagnostic fields which display the duty cycle for each nozzle assembly 22 of fluid application system 10. In other embodiments, user interface 300 may provide any outputs that allow fluid application system 10 to operate as described herein.

While, in some embodiments, the described methods and systems are used to handle a fluid that is applied to agricultural fields, such as an herbicide or a pesticide, the described methods and systems may be used for handling any type of fluids, not just fluids for use in the agricultural industry.

Embodiments of the methods and systems described herein may more efficiently apply materials, such as fluids, to surfaces compared to prior methods and systems. For example, the systems and methods described provide improved fluid application systems that increase the precision and operating efficiency of foliage spray systems. In addition, the methods and systems reduce the time required to adjust operating parameters, such as duty cycle, based on the position of a nozzle assembly relative to foliage.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

When introducing elements of the present invention or the preferred embodiment(s) thereof, the articles "a", "an", "the" and "the" are intended to mean that there are one or more of the elements. The terms "comprising", "including" and "having" are intended to be inclusive and mean that there may be additional elements other than the listed elements. Moreover, the use of "top", "bottom", "above", "below" and variations of these terms is made for convenience, and does not require any particular orientation of the components.

As various changes could be made in the above without departing from the scope of the invention, it is intended that all matter contained in the above description and shown in the accompanying drawings shall be interpreted as illustrative and not in a limiting sense.

What is claimed is:

1. A system for applying agricultural fluid to a target, the system comprising:
- a fluid supply line connected to a fluid supply;
- a plurality of nozzle assemblies connected in fluid communication with the fluid supply line, the nozzle assemblies being spaced circumferentially from one another and oriented radially outward to spray portions of the target;
- a plurality of electrically actuated valve assemblies, each valve assembly of the plurality of electrically actuated valve assemblies connected in fluid communication between the fluid supply line and a corresponding one of the plurality of nozzle assemblies to control fluid flow through the respective nozzle assembly;
- a controller communicatively connected to the valve assemblies and configured to control at least one operating parameter of each valve assembly; and
- a portable electronic device connected in communication with the controller, the portable electronic device including a user interface that displays a graphical user interface, wherein the portable electronic device is configured to:
  - retrieve a stored user profile including at least one prestored value that relates to a physical characteristic of the system or an operating parameter of the system, the at least one prestored value including at least one of a spray diameter and a circumferential spacing between the nozzle assemblies; and
  - populate at least one user input field of the graphical user interface with the at least one prestored value;
- wherein at least one of the controller and the portable electronic device is configured to retrieve the stored user profile and determine the at least one operating parameter of each valve assembly based on the physical characteristic of the system or the operating parameter of the system.

2. The system of claim 1, wherein the portable electronic device is configured to retrieve the stored user profile from a memory including a profile selection menu having a plurality of stored user profiles.

3. The system of claim 2, wherein the stored user profile is a default user profile that is used to populate the at least one user input field with pre-stored values.

4. The system of claim 2, wherein the portable electronic device is configured to:
receive, via the user interface, a user selection of the stored user profile from the profile selection menu; and
retrieve the stored user profile based on the user selection.

5. The system of claim 2, wherein the portable electronic device is configured to store a new user profile in the memory based on a user input.

6. The system of claim 1, wherein the at least one prestored value further includes at least one of a specific gravity of a material emitted by the plurality of nozzle assemblies, a size of the valve assemblies, a size of the nozzle assemblies, and a dimension of a manifold connected to the plurality of nozzle assemblies.

7. The system of claim 1, wherein the portable electronic device is configured to send a signal relating to the physical characteristic of the system or the operating parameter of the system to the controller.

8. The system of claim 1, wherein the plurality of electrically actuated valve assemblies comprise direct acting solenoid valves, each solenoid valve including an actuator configured to pulse with a timing, a duration, a frequency, and a duty cycle determined by the controller.

9. The system of claim 1, wherein at least one of the controller and the portable electronic device is configured to receive an input relating to at least one of flow rate data, a target application rate, nozzle droplet spectra data, a fluid pressure within the fluid supply line, a ground speed at which the system is being moved across a surface, a number of the nozzle assemblies, a size of the nozzle assemblies, a specific gravity of the fluid, a frequency of control signals provided to the valve assemblies, a distance of the nozzle assemblies from a centerline, or a row spacing between adjacent rows of plants.

10. The system of claim 1, wherein the portable electronic device is configured to access the graphical user interface via a website.

11. A method of applying agricultural fluid to a target, the method comprising:
positioning a spray apparatus within a field including the target, the spray apparatus including:
a fluid supply line;
a plurality of nozzle assemblies connected in fluid communication with the fluid supply line, the nozzle assemblies being spaced circumferentially from one another and oriented radially outward to spray portions of the target; and
a plurality of electrically actuated valve assemblies, each valve assembly of the plurality of electrically actuated valve assemblies connected in fluid communication between the fluid supply line and a corresponding one of the plurality of nozzle assemblies to control fluid flow through the respective nozzle assembly, wherein a controller is communicatively connected to the valve assemblies and configured to control at least one operating parameter of each valve assembly;
retrieving, using a portable electronic device connected in communication with the controller, a stored user profile including at least one prestored value that relates to a physical characteristic of the spray apparatus or an operating parameter of the spray apparatus, the at least one prestored value including at least one of a spray diameter and a circumferential spacing between the nozzle assemblies;
populating at least one user input field of a user interface displayed on a user interface of the graphical portable electronic device with the at least one prestored value; and
determining, using at least one of a controller and the portable electronic device, the at least one operating parameter of each valve assembly based on the physical characteristic of the spray apparatus or the operating parameter of the spray apparatus.

12. The method of claim 11, wherein retrieving the stored user profile comprises retrieving a default user profile that is used to populate the at least one user input field with pre-stored values.

13. The method of claim 11, wherein retrieving the stored user profile comprises retrieving the stored user profile from a memory including a profile selection menu having a plurality of stored user profiles.

14. The method of claim 13 further comprising:

receiving, via the user interface, a user selection of the stored user profile from the profile selection menu; and retrieving the stored user profile based on the user selection.

15. The method of claim 13 further comprising storing, using the portable electronic device, a new user profile in the memory based on a user input.

16. The method of claim 11, wherein populating the at least one user input field with the at least one prestored value further comprises populating the at least one user input field with at least one of a specific gravity of a material emitted by the plurality of nozzle assemblies, a size of the valve assemblies, and a size of the nozzle assemblies.

17. The method of claim 11 further comprising sending, using the portable electronic device, a signal relating to the physical characteristic of the spray apparatus or the operating parameter of the spray apparatus to the controller.

18. The method of claim 11, wherein the electrically actuated valve assemblies comprise plurality of direct acting solenoid valves, each solenoid valve including an actuator configured to pulse with a timing, a duration, a frequency, and a duty cycle, wherein determining the at least one operating parameter of each valve assembly comprises determining the timing, the duration, the frequency, or the duty cycle of the actuator.

19. The method of claim 11 further comprising receiving, using at least one of the controller and the portable electronic device, an input relating to at least one of flow rate data, a target application rate, nozzle droplet spectra data, a fluid pressure within the fluid supply line, a ground speed at which the spray apparatus is being moved across a surface, a number of the nozzle assemblies, a size of the nozzle assemblies, a specific gravity of the fluid, a frequency of control signals provided to the valve assemblies, a distance of the nozzle assemblies from a centerline, or a row spacing between adjacent rows of plants.

20. The method of claim 11, wherein the portable electronic device is configured to access the graphical user interface via a website.

* * * * *

UNITED STATES PATENT AND TRADEMARK OFFICE
CERTIFICATE OF CORRECTION

| | | |
|---|---|---|
| PATENT NO. | : 12,239,123 B2 | Page 1 of 1 |
| APPLICATION NO. | : 18/364144 | |
| DATED | : March 4, 2025 | |
| INVENTOR(S) | : Jeffrey John Grimm | |

It is certified that error appears in the above-identified patent and that said Letters Patent is hereby corrected as shown below:

In the Claims

In Claim 11, Column 16, Lines 4-5, delete "user input field of a user interface displayed on a user interface of the graphical portable" and insert therefor -- user input field of a graphical user interface displayed on a user interface of the portable --.

In Claim 18, Column 16, Lines 39-40, delete "wherein the electrically actuated valve assemblies comprise plurality of direct acting" and insert therefor -- wherein the plurality of electrically actuated valve assemblies comprise direct acting --.

Signed and Sealed this
Twelfth Day of August, 2025

Coke Morgan Stewart
*Acting Director of the United States Patent and Trademark Office*